United States Patent
Wu et al.

(10) Patent No.: US 9,761,275 B2
(45) Date of Patent: Sep. 12, 2017

(54) SYSTEM AND METHOD FOR SPATIOTEMPORAL IMAGE FUSION AND INTEGRATION

(71) Applicant: Conduent Business Services, LLC, Dallas, TX (US)

(72) Inventors: Hao Wu, Pittsford, NY (US); Robert P. Loce, Webster, NY (US)

(73) Assignee: Conduent Business Services, LLC, Dallas, TX (US)

( * ) Notice: Subject to any disclaimer, the term of this patent is extended or adjusted under 35 U.S.C. 154(b) by 0 days.

(21) Appl. No.: 14/805,710

(22) Filed: Jul. 22, 2015

(65) Prior Publication Data
US 2016/0254024 A1    Sep. 1, 2016

Related U.S. Application Data

(60) Provisional application No. 62/121,811, filed on Feb. 27, 2015.

(51) Int. Cl.
| | |
|---|---|
| *H04N 5/225* | (2006.01) |
| *G11B 27/031* | (2006.01) |
| *G06K 9/00* | (2006.01) |

(52) U.S. Cl.
CPC ........ *G11B 27/031* (2013.01); *G06K 9/00751* (2013.01)

(58) Field of Classification Search
CPC .................. G06K 9/00718; G11B 27/031
USPC ...................................................... 348/169
See application file for complete search history.

(56) References Cited

U.S. PATENT DOCUMENTS

| | | |
|---|---|---|
| 2005/0122397 A1 | 6/2005 | Henson |
| 2011/0170744 A1 | 7/2011 | Malinovskiy |
| 2011/0317009 A1 | 12/2011 | Kumaraswamy |
| 2013/0265419 A1 | 10/2013 | Bulan et al. |
| 2014/0368652 A1 | 12/2014 | Wang |
| 2014/0375804 A1 | 12/2014 | Bulan et al. |
| 2014/0376769 A1 | 12/2014 | Bulan et al. |
| 2015/0086071 A1* | 3/2015 | Wu .................. G06T 15/205 382/103 |
| 2015/0278609 A1 | 10/2015 | Wu et al. |

OTHER PUBLICATIONS

Hoover et al. "A Real-Time Occupancy Map From Multiple Video Streams." IEEE International Conference on Robotics and Automation, May 10, 1999.

* cited by examiner

*Primary Examiner* — Hung Dang
*Assistant Examiner* — Girumsew Wendmagegn
(74) *Attorney, Agent, or Firm* — Fay Sharpe LLP

(57) ABSTRACT

A system and method for creating a spatiotemporal image representation with information content that enables accurate and rapid processing for several applications.

18 Claims, 6 Drawing Sheets
(2 of 6 Drawing Sheet(s) Filed in Color)

SYSTEM AND METHOD FOR SPATIOTEMPORAL IMAGE FUSION AND INTEGRATION

This application claims priority to and the benefit of the filing date of U.S. Provisional Application No. 62/121,811, filed Feb. 27, 2015, which application is herein incorporated by reference in its entirety.

BACKGROUND

The present disclosure relates to a system and method for creating a spatiotemporal image representation with information content that enables accurate and rapid processing. The disclosure finds particular application in connection with spatiotemporal (ST) image representation of a sequence of video images. However, it is to be appreciated that the present exemplary embodiments are also amendable to other like applications.

In the computer vision community, spatiotemporal processing techniques have recently gained more attention. Different methods have been proposed and studied by researchers for various applications.

Videos are usually viewed and processed by humans in a sequential mode, where each 2-D video frame (with 2 spatial dimensions) is played in a timely order. Traditional spatiotemporal representations of videos are usually obtained by stacking 1-D (spatial dimension) signals obtained from each 2-D video frame in their time orders. Therefore, the resulting 2-D ST images are composed by one spatial dimension and one time dimension. One traditional way to obtain the 1-D spatial dimension signals is to extract a row or column from the same location in each video frame, where the axis of the row or column becomes the spatial dimension. Successive frames yield successive extractions, which are time-order stacked to form a 2-D ST representation. Another known method for producing an ST representation from a video sequence projects (summarizes or averages) the whole or part of each 2-D video frame along one spatial dimension to reduce the image frame having 2-D spatial dimensions to a signal that is of one spatial dimension, and the sequence of 1-D signals resulting from the extractions are stacked to form the 2-D ST image.

Many existing applications using spatiotemporal representation of videos are focused on characterizing camera motion. One approach is directed at how to extract motion velocity that corresponds to an orientation in spatiotemporal space using a set of quadratic pairs of linear filters. Examples consist of rigid patterns moving constantly in one direction with no background clutter. Other approaches have relied on different algorithms to estimate camera motion in the spatiotemporal domain. In one approach video tomography is used to extract lens zoom, camera pan and camera tilt information from a video sequence using the Hough transform to compute a linear camera model in the spatiotemporal images. A similar method analyzes a video sequence to characterize camera motion and involves determining a 2-D spatiotemporal representation wherein trace lines are determined by quantizing the 2-D spatiotemporal representation and finding boundaries between the quantized regions. Camera motion is then inferred by analyzing the pattern of the trace lines using Hough transforms.

Some other attempts have been directed at trying to detect moving objects in a constrained situation, where objects usually move at a constant velocity in front of a static camera. These algorithms often involve detecting straight lines or planes by using the Hough transform. In one example, the gait patterns generated by walking humans are analyzed using XT (spatiotemporal) slices. The Hough transform is then used to locate the straight line patterns in XT slices. In another example, a perceptual organization-based method is used to describe the motion in terms of compositions of planar patches in the 3-D spatiotemporal domain.

Yet another approach is directed at analyzing object motion in less constrained videos using spatiotemporal slices. This method involves using structure tensor analysis to first estimate the local orientation in each spatiotemporal slice. A 7-bin 2-D tensor histogram is then formed and the detected dominant motion is used as the background motion to reconstruct the background image in the spatial domain. Background subtraction is then used to roughly detect the foreground objects, and the results are further refined using color information.

More recently, researchers have started to use spatiotemporal features which are obtained directly from 3-D video volume to assist action/activity/behavior detection and recognition.

Other than applications in characterizing camera motion, detecting/tracking a moving object and representing local volume features, spatiotemporal related methods are also used in video stabilization, visual attention extraction, block matching, parked car detection and human counting, for example.

Current spatiotemporal processing methods and applications use one or multiple spatiotemporal signals/images/slices and process them separately as shown in method 10 of FIG. 1. Integrations may happen after each individual spatiotemporal processing.

INCORPORATION BY REFERENCE

The following references, the disclosures of which are incorporated by reference herein in their entireties are mentioned:

U.S. application Ser. No. 14/805,608, filed Jul. 22, 2015, by Wu, et al., entitled "Video-Based System and Method for Parking Occupancy Detection"; and, U.S. application Ser. No. 14/033,059, filed Sep. 20, 2013, by Wu, et al., entitled "Methods and Systems for Efficiently Monitoring Parking Occupancy".

BRIEF DESCRIPTION

The current spatiotemporal processing methods and applications that use one or multiple spatiotemporal signals/images/slices and process them separately may not be effective for certain applications. The present disclosure sets forth a system and method for creating a spatiotemporal image representation with information content that enables effective and accurate processing for several applications. This approach differs from traditional spatiotemporal methods in that the traditional approach processes the unfused slices separately. It has been found, however, that significant improvements in certain applications, such as detection, can be realized by fusing multiple slices/images prior to forming the new spatiotemporal representation.

In accordance with one aspect, a method for processing a sequence of images comprises, some or all of the following steps, acquiring a sequence of images, the images related to each other by a common parameter, extracting multiple 1D signals from at least one image of the of the sequence of images, stacking the 1D signals to form multiple 1D signal vs common parameter stacks, applying a joint transform with at least two 1D signal vs common parameter stacks as input, and outputting at least one transformed signal vs. common parameter stack.

In one embodiment, acquiring a sequence of images includes acquiring video comprising a plurality of temporally related images, wherein the common parameter is time. In another embodiment, acquiring a sequence of images includes acquiring a plurality of images of a physical location taken from a plurality of vantage points, at least two of the images including common features of the physical location, wherein the common parameter is space. Applying the joint transform can include using a multiple input, multiple output function, wherein the multiple inputs include multiple 1D signal vs common parameter stacks. The method can further comprise redefining at least one of the 1D signal vs common parameter stacks into RGB color channels, transferring the RGB color channels to HSV, and normalizing V to suppress global illumination fluctuation, performing temporal noise reduction on the at least one 1D signal vs common parameter stack, performing spatial noise reduction on the at least one 1D signal vs common parameter stack, performing preprocessing of the at least one 1D signal vs common parameter stacks, and/or generating a plurality of 1D signal vs common parameter stacks, each 1D signal vs common parameter stacks comprised of lines of data extracted from the same location in each image of the sequence of images.

In accordance with another aspect, a system for processing a sequence of images is set forth. The system comprises a memory in communication with a processor configured to acquire a sequence of images, the images related to each other by a common parameter, extract multiple 1D signals from at least one image of the sequence of images, stack the 1D signals to form multiple 1D signal vs common parameter stacks, apply a joint transform with at least two 1D signal vs common parameter stacks as input, and output at least one transformed signal vs. common parameter stack.

In one embodiment, the processor can be further configured to acquire video comprising a plurality of temporally related images, wherein the common parameter is time. In another embodiment, the processor can be further configured to acquire a plurality of images of a physical location taken from a plurality of vantage points, at least two of the images including common features of the physical location, wherein the common parameter is space. The processor can be further configured to apply the joint transform including using a multiple input, multiple output function, wherein the multiple inputs include multiple 1D signal vs common parameter stacks. The processor can be further configured to redefine at least one of the 1D signal vs common parameter stacks into RGB color channels, transfer the RGB color channels to HSV, and normalize V to suppress global illumination fluctuation, perform temporal noise reduction on the at least one 1D signal vs common parameter stack, perform spatial noise reduction on the at least one 1D signal vs common parameter stack, perform preprocessing of the at least one 1D signal vs common parameter stacks, and/or generate a plurality of 1D signal vs common parameter stacks, each 1D signal vs common parameter stacks comprised of lines of data extracted from the same location in each image of the sequence of images.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 7($b$) is an exemplary output image of an image sequence processed in accordance with aspects of the present disclosure.

DETAILED DESCRIPTION

The present disclosure will be described in connection with a computer vision system and method for a parking occupancy system. It should be appreciated, however, that the present disclosure is not limited to any particular application, and that aspects of the disclosure can be applied as a preprocessing step in many of the spatiotemporal related works mentioned above. That is, the present disclosure, although described in the context of a parking occupancy system, is not limited to a parking occupancy system.

Figure 2:
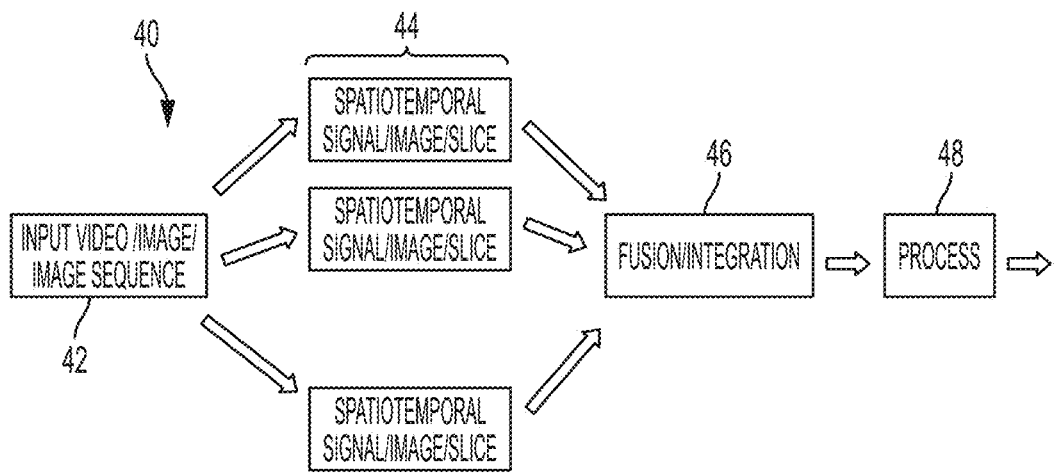
FIG. 2 is a block diagram depicting an exemplary spatio-temporal processing method in accordance with the present disclosure.

With reference to FIG. 2, a method 40 to combine/integrate/fuse multiple spatiotemporal signals/images/slices and produce one or multiple integrated spatiotemporal signals/images/slices is illustrated. There are potentially many different ways to do the integration/fusion. One exemplary embodiment provides a fast and effective way to handle/stabilize illumination changes in the environment through the integration of the multiple spatiotemporal signals/images/slices. As illumination change is one major source of noise/variations in computer vision based applications, especially for outdoor videos. Aspects of the present disclosure will find broad applications in various vision algorithms/systems.

Figure 1:
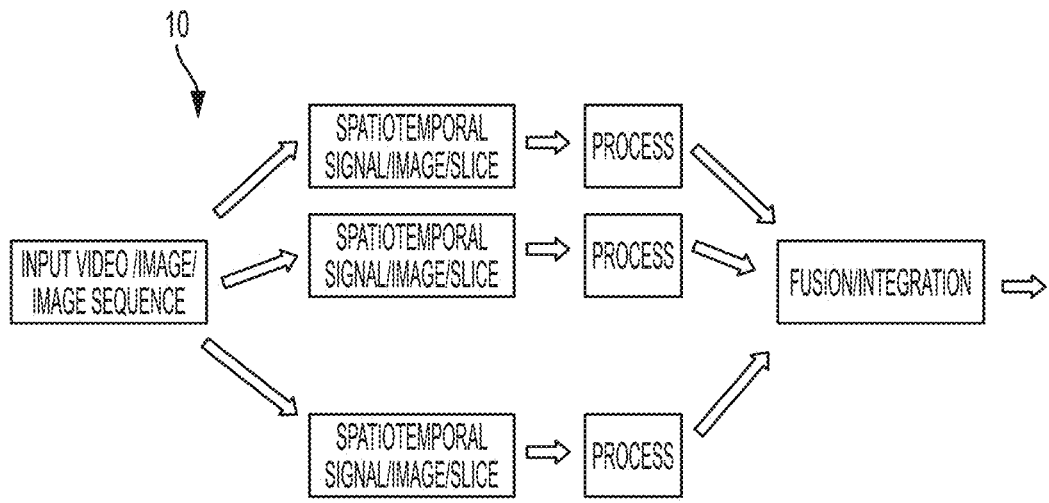
FIG. 1 is a block diagram depicting a prior art spatio-temporal processing method.

FIG. 2 shows an exemplary embodiment of the present disclosure, which may be compared to the traditional spatiotemporal approach shown in FIG. 1. The method 40 generally comprises the following steps:

(1) Acquire a temporal (or other) sequence of image frames in process step 42 (i.e., video sequence);

(2) Extract multiple 1D signals corresponding to different spatial positions/regions from at least 1 image frame from the temporal sequence of image frames in process step 44;

(3) Stack the 1D signals extracted from image frames that correspond to different time periods to form multiple Signal vs. Temporal stacks in process step 46;

(4) Apply a joint transform with at least two Signal vs. Temporal stacks as input and at least one Transformed Signal vs. Temporal Stack as output in process step 48.

It will be appreciated that, after process step 48, the representation may be further processed according to the needs of a particular application.

Figure 3:
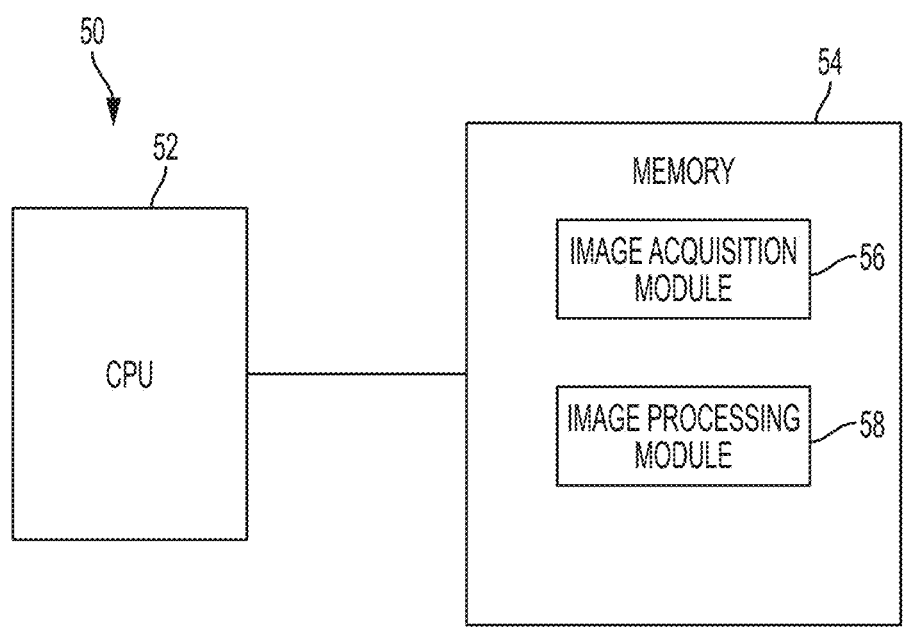
FIG. 3 is an exemplary system for spatio-temporal image processing in accordance with the present disclosure.

FIG. 3 illustrates a basic system 50 that includes a CPU 52 operatively connected to a memory 54. Memory 54 contains an image acquisition module 56 and an image processing module 58. It will be appreciated that the image acquisition module 56 is configured to acquire a sequence of images from an image source, such as images stored in memory 54 or received from a camera or other device. Image processing module 58 contains the image processing algorithm for processing the images in accordance with the present disclosure. It should also be appreciated that the CPU 52 and memory 54 can be a standalone system or can be integrated into an existing image processing system, such as imaging systems for monitoring parking areas as noted above.

Figure 4:
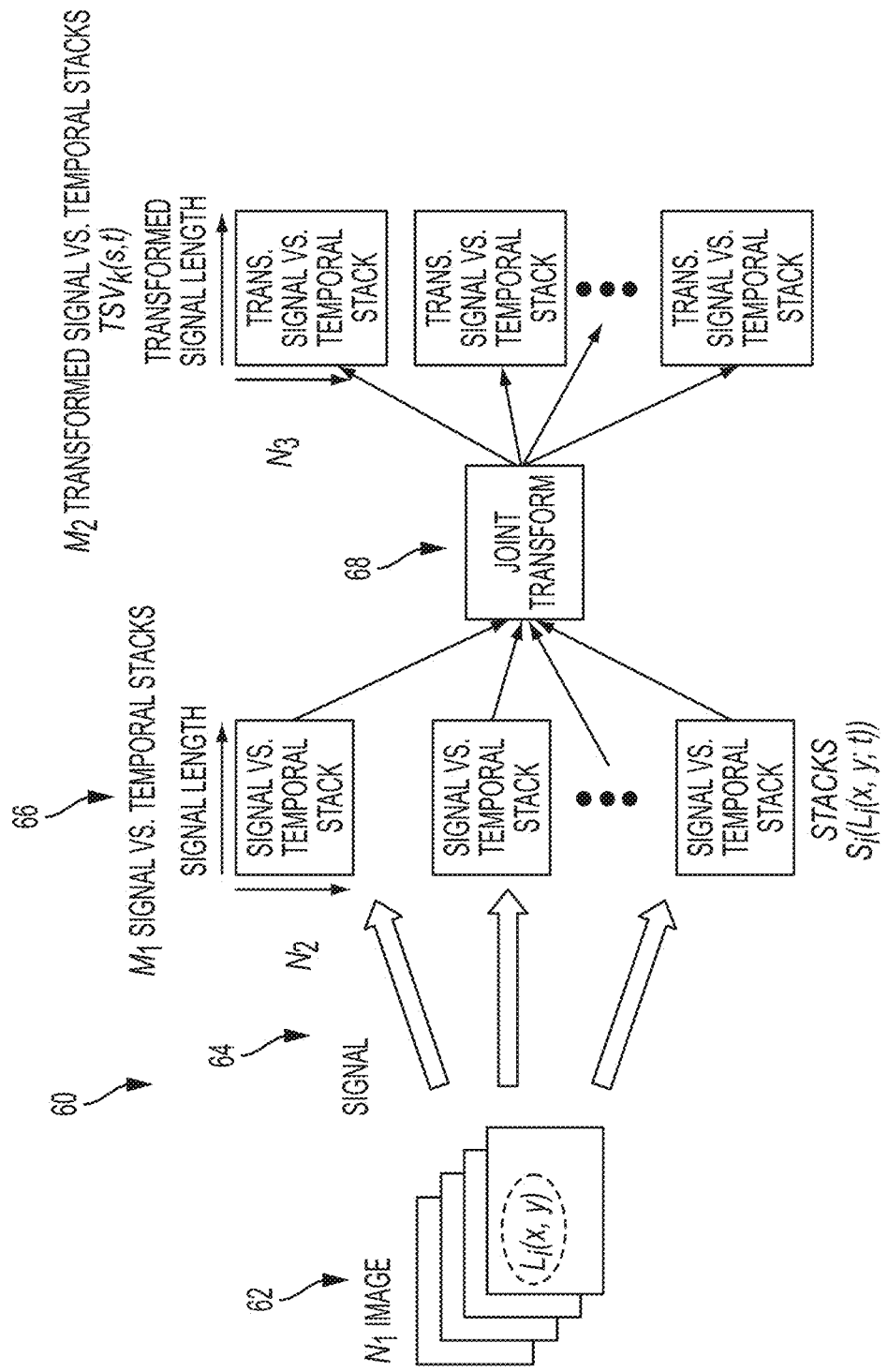
FIG. 4 is a block diagram depicting another exemplary spatio-temporal image processing method in accordance with the present disclosure.

Turning to FIG. 4, a more detailed block diagram 60 illustrates an exemplary embodiment of the present disclosure. In process step 62 a temporal sequence of image frames (i.e., video sequence) is acquired. Spatiotemporal image representation and processing starts with a sequence of temporally (or other) related image frames, extracts spatial information from each frame or representative frames and stacks the information to form a representation of the set of video frames. The video frames can be acquired using any of a variety of video cameras, such as Red/Green/Blue (RGB), Near Infrared (NIR), Thermal, fisheye, monochromatic, etc., for example. The image frames can be acquired directly from a camera or may be originally acquired by a camera, stored and extracted from storage for processing. Frame rates of video imaging can vary depending on the application, while many common cameras typically will operate at 30 frames/second. Videos or image sequences can be pre-processed for some purposes, such as lens distortion correction, noise reduction, contrast enhancement, shadow removal etc. This preprocessing is optional but can be useful in some applications to improve efficiency and/or accuracy detection.

It should be appreciated that the frames need not be a temporal sequence acquired at a fixed temporal interval. The interval may be varied according to various events, such as events occurring in the video, lighting changes, and bandwidth capabilities of the camera and a possible network infrastructure. Varying the interval can provide certain advantages. For example, if there isn't any activity of motion detected in the video sequence, frames with no relevant activity can be ignored (e.g., not used for creating a stack). Eliminating frames without motion can prevent false detections in the stacked images. Also, it can save processing time, when processing the ST image. In some applications, it may be advantageous to have frames wherein lighting changes are evident, such as a cloud blocking the sun, shadows moving with the sun, street lights and other lights coming on. Having many frames around (before and/or after) such changes can allow those image changes to be better distinguished from events such as the change that occurs when a vehicle enters or exits a parking spot.

Even more generally, the image frames may only be related in some way (e.g., other than temporally related). For example, the image frames could be a series of images taken along the length of a street, stadium, walkway, etc., wherein the images are related as a sequence in space. Creating a stacked image from these types of frames does not create a literal spatio "temporal" image. The image is a stacked image, however, and can be processed in a similar manner to a typical ST image. Whereas a temporal stacking will give a representation of image activity (e.g., parking enters/exits) over time, a spatial stacking gives a representation of distance (e.g., vehicle presence over a long street). The spatial sequence could come from multiple cameras acquiring images along, for instance, a street. Or, a camera, such as a Pan Tilt Zoom (PTZ) camera could adjust view angles and zoom to give different views along a street in a sequence of video frames. As used herein, the term common parameter refers to the manner in which the images of a sequence of images are related. For example, images of a video sequence are temporally related, whereby time is the common parameter. In other sequences of images, space and/or proximity is the common parameter.

In process step 64, multiple 1D (1 dimensional) signals (e.g., vectros of data) corresponding to different spatial positions/regions from at least 1 image frame from the temporal sequence of image frames are extracted. In one embodiment, pixel values can be extracted from one or more video frames and signals are formed from the extracted values. In general, for example, the pixel values could come from one or more frames, and the signals could be the pixels values themselves or information extracted from the pixel values, such as median value within a neighborhood, difference between different pixels/regions, histogram, SIFT or some other image feature vector. The signal can be written as $L_i(x, y; t)$, where it is formed from pixel values at $(x, y) \in R_i$, where $R_i$ denotes the specific region/location where the pixel values are used for obtaining this 1D signal over time t, for subsequent stack i. In subsequent steps this signal can be considered to simply have a spatial and temporal dependence (s, t), where s represents the spatial dependence (x, y).

The extracted signals in spatiotemporal representations are often sampled from some of the lines in an image frame. The "lines" in an exemplary embodiment can be used to form signals that represent some generic geometric regions in an image frame, which can be of any form. That is, the geometric region doesn't have to be a row or column, or a straight angled line, it can also be a curve across the image. The thickness of the lines can be of any number of pixels. For example, the thickness can range from partial pixel, one pixel, and multiple pixels, or even to a whole image. The "line" could be a sparse sampling over a region. The sampled value along the lines could be original pixel value, color value, or other appropriate filtered or processed or extracted value, for example. In one embodiment, the signal $L_i(x, y; t)$ is a raster line of pixel values indexed by (x, y), taken at time t.

In process step 66, the 1D signals extracted from image frames that correspond to different time periods are stacked to form multiple Signal vs. Temporal stacks.

In process step 68, a joint transform is applied with at least two Signal vs. Temporal stacks as input. The joint transform generates at least one Transformed Signal vs. Temporal Stack as output, identified generally by reference numeral 70.

It should be appreciated that Multiple Signal vs. Temporal Stacks are fused or jointly transformed, such that information from more than one input stack is used to create an output stack. For example, fusing by F is denoted as:

$$TSV_k(s,t)=F(ST_i(L_i(s,t))), \text{ for all stacks } i \text{ fused by } F$$

Where, F is a multiple-input-multiple-output function which performs a fusion (joint transform) operation taken over multiple stacks (multiple i), and output multiple Transformed Signal Value Stack $TSV_k(s,t)$, s and t can denote spatial and temporal coordinates, respectively, but in general they are coordinates in the transformed space.

Additional signal/image processing methods can be applied on the TSV stack or stacks for the particular applications, such as object or motion detection.

In the system/method described above, the pixels from different regions are extracted from a temporal sequence of images, a stack is formed based on the temporal sequence, and information from the stacks is fused using some type of transform to produce transformed stacks.

It should be appreciated that in an alternative embodiment this sequence can include performing the fusing before forming the stack, and then stacking the fused data. For example, the system method can be configured to extract pixels from different regions from one frame, fuse information from the different regions of the one frame using some type of transform to produce transformed regions, then stacking the transformed regions to form produced transformed stacks. In this configuration, the sequence includes one line. To get a longer sequence the fusing, then stacking sequence is followed for more than one frame. As such, aspects of the present disclosure are directed to both stacking then fusing as well as fusing then stacking.

Figure 5:
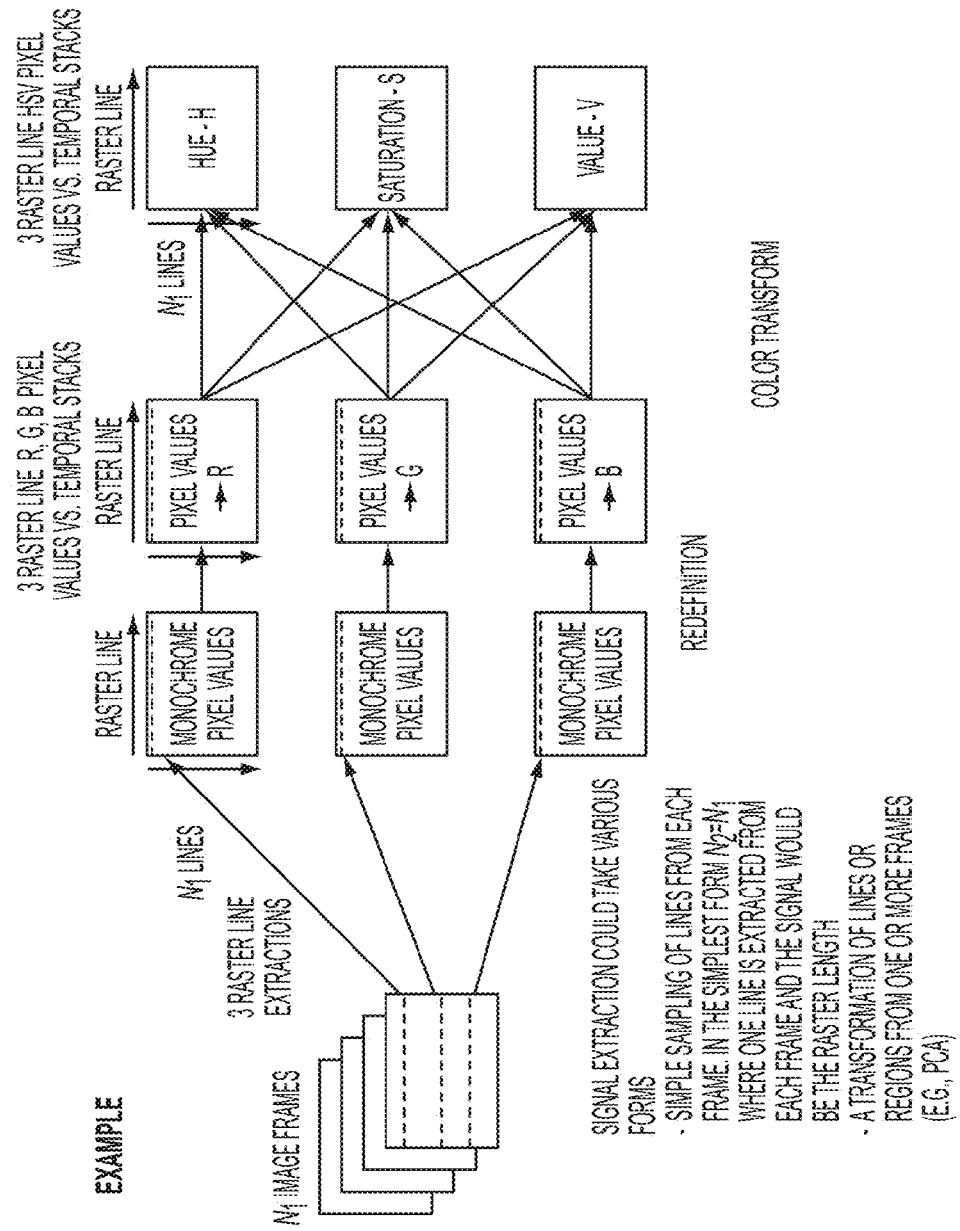
FIG. 5 is a block diagram depicting yet another exemplary spatio-temporal image processing method in accordance with the present disclosure.

With reference to FIG. 5, another exemplary embodiment, a joint chromatic transformation is performed using three ST images to reduce the illumination variations. The transformation can include the following steps:

a redefinition is performed on the three image slices taken from the video at a Region of Interest (ROI) or the three spatiotemporal images (stacks) formed from these slices. The redefinition is performed by putting the three stacks/slices into respective RGB color channels. A combination of the stacks can be considered a color spatiotemporal image, where the color does not reflect the original pixel color in the video, but the difference between the three separate spatiotemporal images. The redefined three stacks can be written:

$$ST(L_1(x,y;t)=ST_1(s,t)=ST_R(s,t) \rightarrow R(ST_R(s,t))$$

$$ST(L_2(x,y;t)=ST_2(s,t)=ST_G(s,t) \rightarrow G(ST_G(s,t))$$

$$ST(L_3(x,y;t)=ST_3(s,t)=ST_B(s,t) \rightarrow B(ST_B(s,t))$$

It should be appreciated that a combined RGB raster line in this stack will have a more neutral color when the pixel values are similar slice to slice, and will be more chromatic for pixels values in the slices that have greater difference. In addition, as lightness of a scene changes due to an ambient conditions such as sun angle, cloud cover, etc., each of R, G and B will increase/decrease at similar rates. Hence, illumination changes will be reflected in the overall lightness of the combined RGB pixels, but will not significantly vary the color saturation or hue.

The RGB image is transformed to a device independent color space having a lightness coordinate hue-saturation-value (HSV) and the V channel is normalized to suppress global illumination fluctuations and emphasize spatial differences through the chromatic variation. Note that transformations from, e.g., Cyan, Magenta, Yellow (CMY) to e.g., L*a*b*, HSL, Luv, . . . or other color spaces could alternatively be used. Methods including dimensionality reduction, contrast enhancement, noise reduction, etc. can also be applied at this step.

Experimental Results

Figure 6:
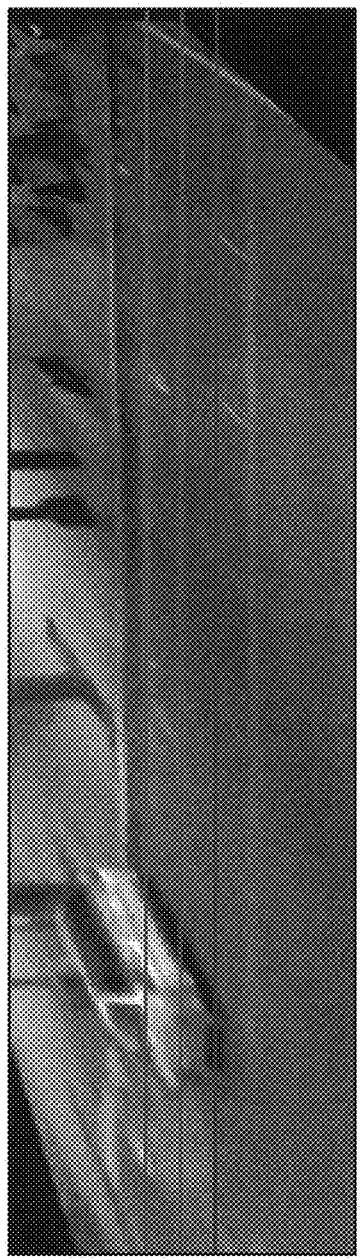
FIG. 6 is an exemplary image frame that can be processed in accordance with aspects of the present disclosure.

FIGS. 6 and 7 illustrate an example of an image from an image sequence, and output results for the image sequence processed in accordance with the exemplary embodiment shown in FIG. 5.

In FIG. 6, an outdoor on-street parking occupancy monitoring video frame is shown. For convenience, the video frame is not the original frame, but the geometrically transformed and cropped frame. However, the proposed method can be used on either unprocessed or processed videos. It will be appreciated that the image shown in FIG. 6 is part of a sequence of images.

Raster lines are extracted from the image frame of FIG. 6 to form a stack. In this example, lines have been color coded to represent the color channels that will be used in their respective redefinition in accordance with the method of FIG. 5. The top line is red, the middle line is green, and the bottom line is blue. For each of a plurality of image frames, these lines represent the geometric region sampled to produce the RGB stacks as previously described in connection with FIG. 5.

Figure 7A:
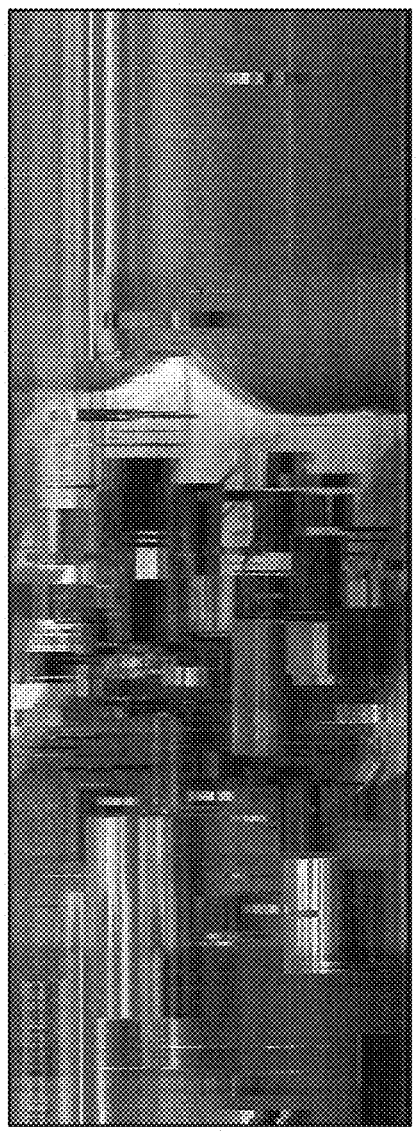
FIG. 7($a$) is an exemplary output image of an image sequence processed in accordance with conventional techniques.
Figure 7B:
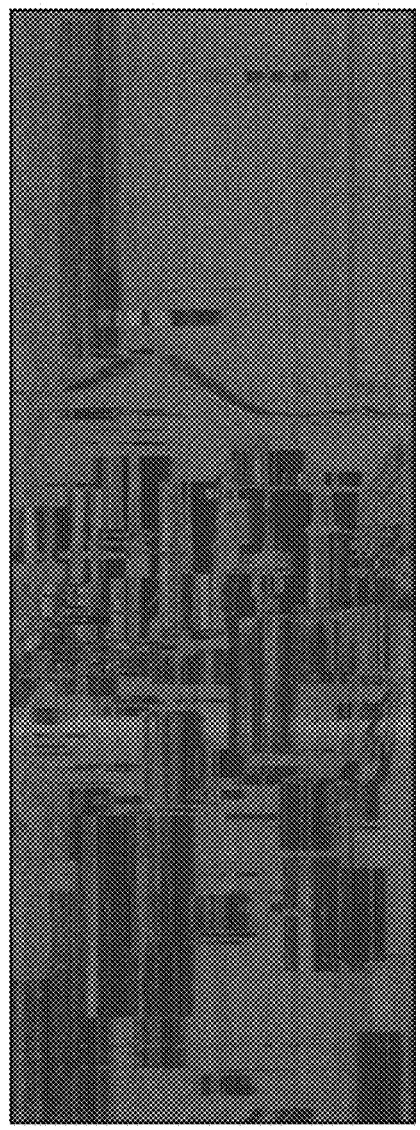

FIGS. 7(a) and 7(b) shows the visual difference between using and not using the fusion and normalization method disclosed in FIG. 5.

In testing the algorithm with and without applying a joint transform to the Signal vs. Temporal stacks on a video collection of 29 days long showed that this integration/fusion step (RGB to HSV) improves the performance by around 15% in terms of accuracy compared to the spatiotemporal processing without this step.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer implemented method for processing a sequence of images comprising:
   using a processor to acquire a sequence of images from at least one of a camera or a memory, the images related to each other by a common parameter and representing a region of interest of a physical location;
   extracting multiple 1D signals from at least one image of the of the sequence of images;
   stacking the 1D signals to form multiple 1D signal vs common parameter stacks;
   applying a joint transform with at least two 1D signal vs common parameter stacks as input; and
   outputting at least one transformed signal vs. common parameter stack, the transformed signal vs. common parameter stack representing the sequence of images.

2. The computer implemented method of claim 1, wherein acquiring a sequence of images includes acquiring video comprising a plurality of temporally related images, wherein the common parameter is time.

3. The computer implemented method of claim 1, wherein acquiring a sequence of images includes acquiring a plurality of images of a physical location taken from a plurality of vantage points, at least two of the images including common features of the physical location, wherein the common parameter is space.

4. The computer implemented method of claim 1, wherein applying the joint transform includes using a multiple input, multiple output function, wherein the multiple inputs include multiple 1D signal vs common parameter stacks.

5. The computer implemented method of claim 1, further comprising redefining at least one of the 1D signal vs common parameter stacks into RGB color channels, transferring the RGB color channels to HSV, and normalizing V to suppress global illumination fluctuation.

6. The computer implemented method of claim 1, further comprising performing temporal noise reduction on the at least one 1D signal vs common parameter stack.

7. The computer implemented method of claim 6, further comprising performing spatial noise reduction on the at least one 1D signal vs common parameter stack.

8. The computer implemented method of claim 7, further comprising performing preprocessing of the at least one 1D signal vs common parameter stacks.

9. The computer implemented method of claim 1, further comprising generating a plurality of 1D signal vs common parameter stacks, each 1D signal vs common parameter stacks comprised of lines of data extracted from the same location in each image of the sequence of images.

10. A system for processing a sequence of images comprising:
a camera for acquiring a sequence of images, the images related to each other by a common parameter; and
a memory in communication with a processor configured to:
extract multiple 1D signals from at least one image of the of the sequence of images;
stack the 1D signals to form multiple 1D signal vs common parameter stacks;
apply a joint transform with at least two 1D signal vs common parameter stacks as input; and
output at least one transformed signal vs. common parameter stack.

11. The system of claim 10, wherein the processor is further configured to acquire video comprising a plurality of temporally related images, wherein the common parameter is time.

12. The system of claim 10, wherein the processor is further configured to acquire a plurality of images of a physical location taken from a plurality of vantage points, at least two of the images including common features of the physical location, wherein the common parameter is space.

13. The system of claim 10, wherein the processor is further configured to apply the joint transform including using a multiple input, multiple output function, wherein the multiple inputs include multiple 1D signal vs common parameter stacks.

14. The system of claim 10, wherein the processor is further configured to redefine at least one of the 1D signal vs common parameter stacks into RGB color channels, transfer the RGB color channels to HSV, and normalize V to suppress global illumination fluctuation.

15. The system of claim 10, wherein the processor is further configured to perform temporal noise reduction on the at least one 1D signal vs common parameter stack.

16. The system of claim 10, wherein the processor is further configured to perform spatial noise reduction on the at least one 1D signal vs common parameter stack.

17. The system of claim 10, wherein the processor is further configured to perform preprocessing of the at least one 1D signal vs common parameter stacks.

18. The system of claim 10, wherein the processor is further configured to generate a plurality of 1D signal vs common parameter stacks, each 1D signal vs common parameter stacks comprised of lines of data extracted from the same location in each image of the sequence of images.

* * * * *